(12) United States Patent
Cheng

(10) Patent No.: US 6,378,890 B1
(45) Date of Patent: Apr. 30, 2002

(54) STANDING DEVICE FOR A COLLAPSIBLE STROLLER

(76) Inventor: Kenny Cheng, No. 16, Lane 47, Chih Feng St., Taipei (TW)

( * ) Notice: Subject to any disclaimer, the term of this patent is extended or adjusted under 35 U.S.C. 154(b) by 0 days.

(21) Appl. No.: 09/591,670

(22) Filed: Jun. 12, 2000

(51) Int. Cl.⁷ ................................................. B62B 7/08
(52) U.S. Cl. ...................................... 280/642; 280/293
(58) Field of Search .............................. 280/293, 295, 280/301, 43.14, 47.2, 47.38, 642, 643, 647, 648, 650, 658; 248/352

(56) References Cited

U.S. PATENT DOCUMENTS

| | | | |
|---|---|---|---|
| 2,353,326 A | * 7/1944 | Troendle | 280/47.38 |
| 4,417,746 A | * 11/1983 | Baron | 280/301 |
| 4,660,850 A | * 4/1987 | Nakao et al. | 280/642 |
| D295,723 S | * 5/1988 | Shioda | D8/396 |
| 5,087,066 A | * 2/1992 | Mong Hsing | 280/650 |
| 5,507,200 A | * 4/1996 | Reed et al. | 280/301 |
| 5,725,238 A | * 3/1998 | Huang | 280/642 |
| 5,865,449 A | * 2/1999 | Castaneda | 280/47.2 |
| 6,099,021 A | * 8/2000 | Benoit | 280/647 |
| 6,273,451 B1 | * 8/2001 | Julien et al. | 280/642 |

FOREIGN PATENT DOCUMENTS

| | | | |
|---|---|---|---|
| CH | 250244 | * 6/1948 | 280/301 |
| GB | 232739 | * 4/1925 | 280/650 |
| GB | 596149 | * 12/1947 | 280/642 |

* cited by examiner

*Primary Examiner*—Frank Vanaman
(74) *Attorney, Agent, or Firm*—Flehr Hohbach Test Albritton & Herbert LLP

(57) ABSTRACT

A standing device is used with a collapsible stroller that has an upper cross bar and a lower cross bar. The standing device includes a connecting rod having a first end pivotally connected to the stroller upper cross bar and a second end, a radial pivotal pin secured on a central portion of the stroller lower cross bar and extending in a horizontal direction, and a leg pivotally connected to the pivotal pin, extending in a slant direction from the pivotal pin down to the ground, and having a pivotal joint pivotally connected to the second end of the connecting rod. Connection is such that the leg is retracted to a position parallel to the lower cross bar when the stroller is unfolded, and the leg is pivotally moved to contact the ground by the connecting rod when the stroller is collapsed.

13 Claims, 4 Drawing Sheets

STANDING DEVICE FOR A COLLAPSIBLE STROLLER

FIELD OF THE INVENTION

The present invention generally relates to strollers for children, and more particularly to a standing device for a collapsible stroller.

BACKGROUND OF THE INVENTION

In a copending U.S. application 09/483,793 filed on Jan. 14, 2000 by the present applicant, a standing device for keeping a collapsed stroller in an upright stable position is described. Since the standing device has to be connected between a basket supporting rib and a rear wheel axle at a substantial central portion thereof, the utilization of a basket is inevitably obstructed by the standing device. Further, as the standing device is positioned outside the basket, the aesthetic appeal of the stroller is diminished. The disclosure of copending application Ser. No. 09/483,793 is incorporated by reference into the present disclosure.

SUMMARY OF THE INVENTION

Therefore, it is an object of the present invention to provide a standing device for a collapsed stroller that overcomes the above-described inconvenience caused by the standing device in the copending application.

Another object of the invention is to provide a virtually invisible standing device for a collapsible stroller without damaging the aesthetic appeal of the stroller.

The present invention includes a standing device for use with a collapsible stroller of the type having a stroller upper crossing bar and a stroller lower cross bar. The standing device includes a connecting rod having a first end pivotally connectable to the stroller upper cross bar and having a second end, a radial pivotal pin securable to a central portion of the stroller lower cross bar and extending in a horizontal direction. The standing device further includes a leg pivotally connected to the radial pivotal pin and extending in a slant direction therefrom toward the ground, and having a pivotal joint pivotally connected to the second end of the connecting rod. Connection is such that when connected to a stroller, the leg is retracted to a position parallel to the stroller lower cross bar when the stroller is unfolded, and when the stroller is collapsed the leg is pivotally moved by the connecting rod to contact the ground.

BRIEF DESCRIPTION OF THE DRAWINGS

A complete understanding of the present invention may be gained by considering the following detailed description in conjunction with the accompanying drawings, in which.

DESCRIPTION OF THE INVENTION

Reference will now be made in detail to the preferred embodiment of the invention, examples of which are illustrated in the accompanying drawings. Throughout the description, like elements will be referred to by corresponding reference numbers.

Figure 1:
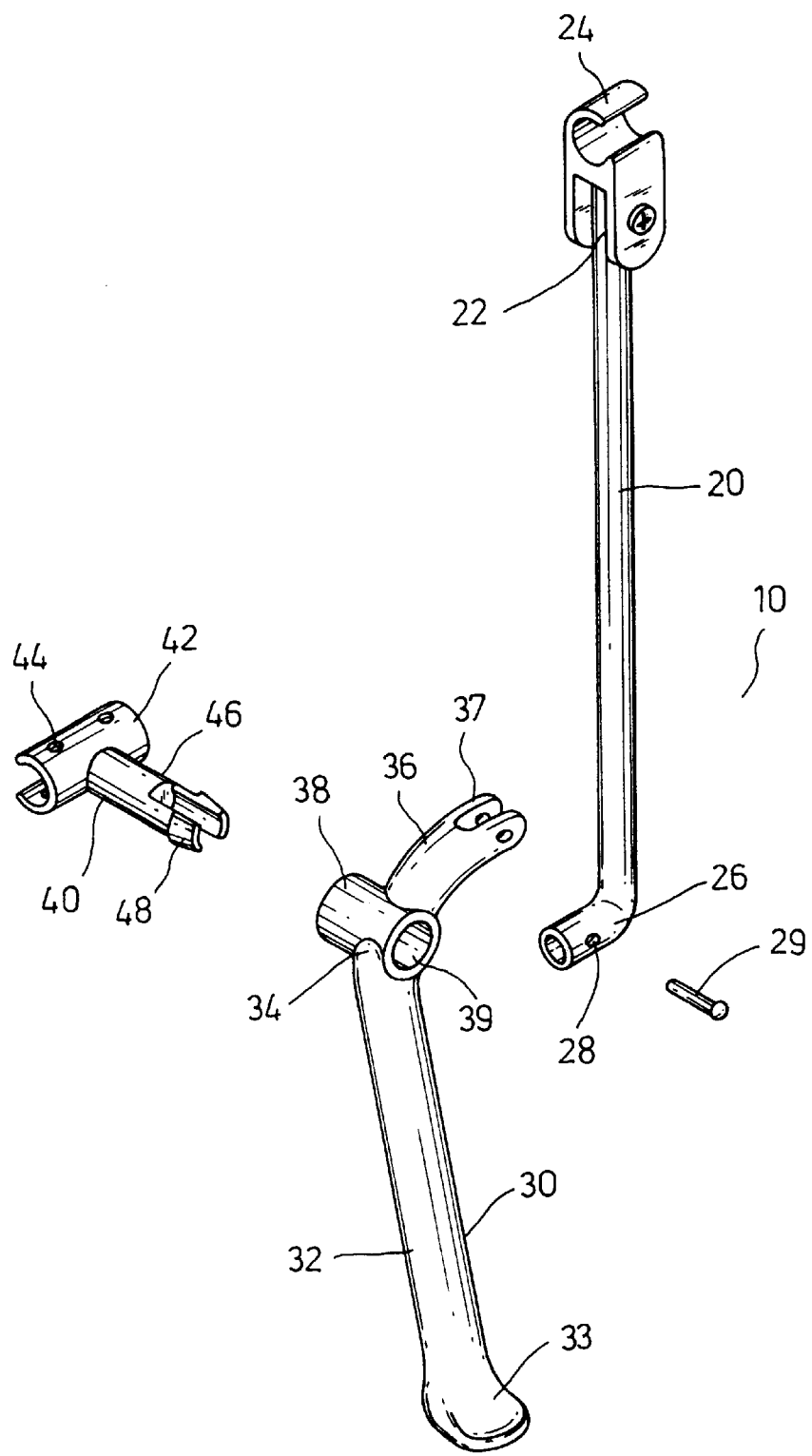
FIG. 1 shows a perspective exploded view of a standing device in accordance with a first embodiment of the present invention.
Figure 2:
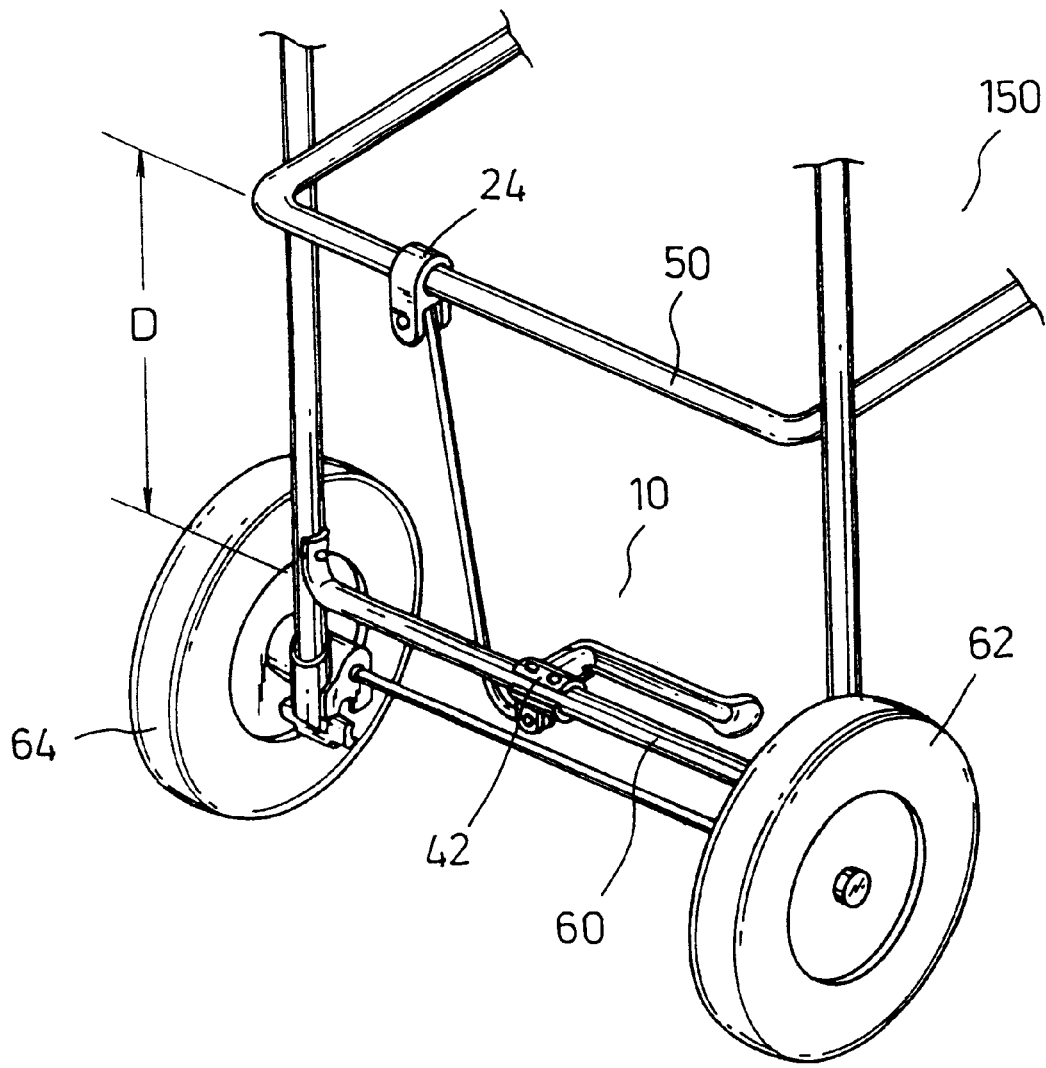
FIG. 2 shows a perspective view of the standing device of FIG. 1 assembled to an upper cross bar and a lower cross bar of the stroller.

FIG. 1 is a perspective exploded view of a standing device 10 in accordance with the present invention for use with a stroller 150, partially shown in FIG. 2. In FIG. 1, the standing device 10 includes a connecting rod 20, a leg 30, and a mounting piece 40. The connecting rod 20 is preferably bent to facilitate use of a stroller basket (not shown) and has a first end 22 provided with a C-shaped tube holder 24 and a second end 26 provided with a hole 28 for pivotally connecting to the leg 30 with a rivet 29. The mounting piece 40 is preferably an integrally-formed piece having a C-shaped tube holder 42 for fixedly connecting to a lower cross bar 60 shown in FIG. 2 and a pivotal pin 46. As shown in FIG. 1, the C-shaped tube holder 42 defines a plurality of holes 44 on opposite walls of the C-shaped tube holder 42 for riveting to the lower cross bar 60 in FIG. 2. The pivotal pin 46 further forms a plurality of snap action retention detents 48 on a distal end thereof.

Figures 3, 4:
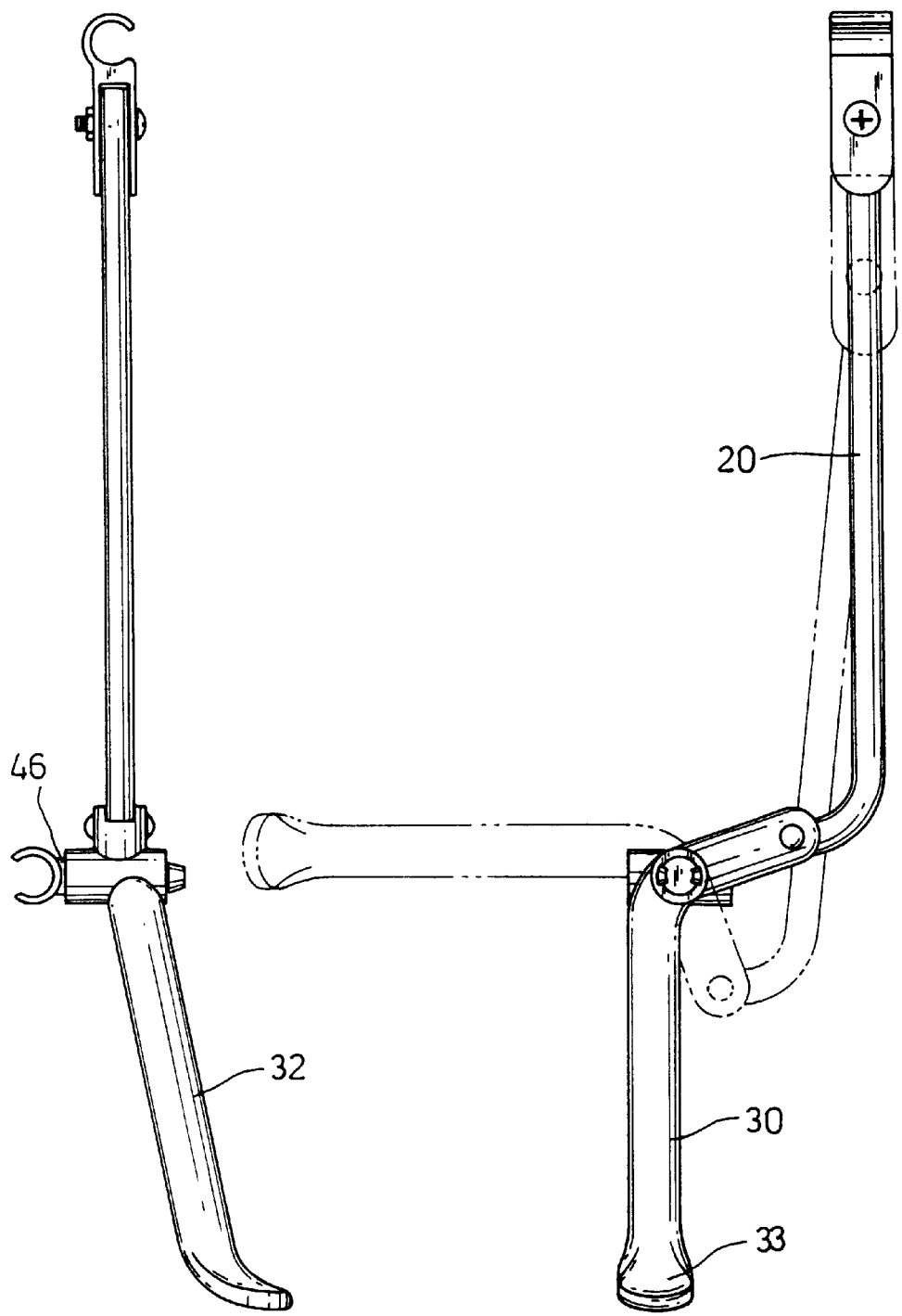
FIG. 3 shows a front view of the standing device of FIG. 1 illustrating the operation of the standing device.
FIG. 4 shows a side view of the standing device of FIG. 1.

The leg 30 defines a bent knee 34, a shank 32, and a thigh 36. A joint 37 for pivotally connecting to the second end 26 of the connecting rod 20 is defined at an end of the thigh 36. The bent knee 34 further defines a transversally extending tube 38. Tube 38 includes an aperture 39 for the detents 48 on the pivotal pin 46 to pass through and engage with an outer edge of the tube 38 such that the leg 30 is latched to mounting piece 40 and pivots around the pin 46. As shown in FIG. 4, the shank 32 extends in a slant direction from the pivotal pin 46 down to the ground. As shown in FIG. 1, the shank 32 forms a transversally extending foot 33 at a distal end thereof that is shaped to present a greater contact area with the ground.

In FIG. 2, the standing device 10 has been assembled to the partially-shown stroller 150. As shown, the C-shaped tube holder 24 has been pivotally connected to an upper cross bar 50 of the stroller 150. Further, the C-shaped tube holder 42 has been fixedly riveted to the lower cross bar 60 of the stroller 150 such that the C-shaped tube holder 42 does not move relatively to the lower cross bar 60.

In FIG. 3, when the stroller (not shown) is in a collapsed position, a span D between the upper cross bar 50 and the lower cross bar 60 (see FIG. 2) is elongated such that if the connecting rod 20 is moved upward leg 30 will be pivotally moved downward. The foot 33 thus contacts the ground in cooperation with rear wheels 62, 64 (shown in FIG. 2) as a support for the collapsed stroller. When the stroller (not shown) is in a collapsed position, the span D between the upper cross bar 50 and the lower cross bar 60 (see FIG. 2) is shortened. Thus, as the connecting rod 20 is moved downward, the leg 30 is pivotally moved upward, as shown in phantom lines. The foot 33 is thus retracted to a position substantially parallel to the lower cross bar as shown in FIG. 2.

Figure 5:
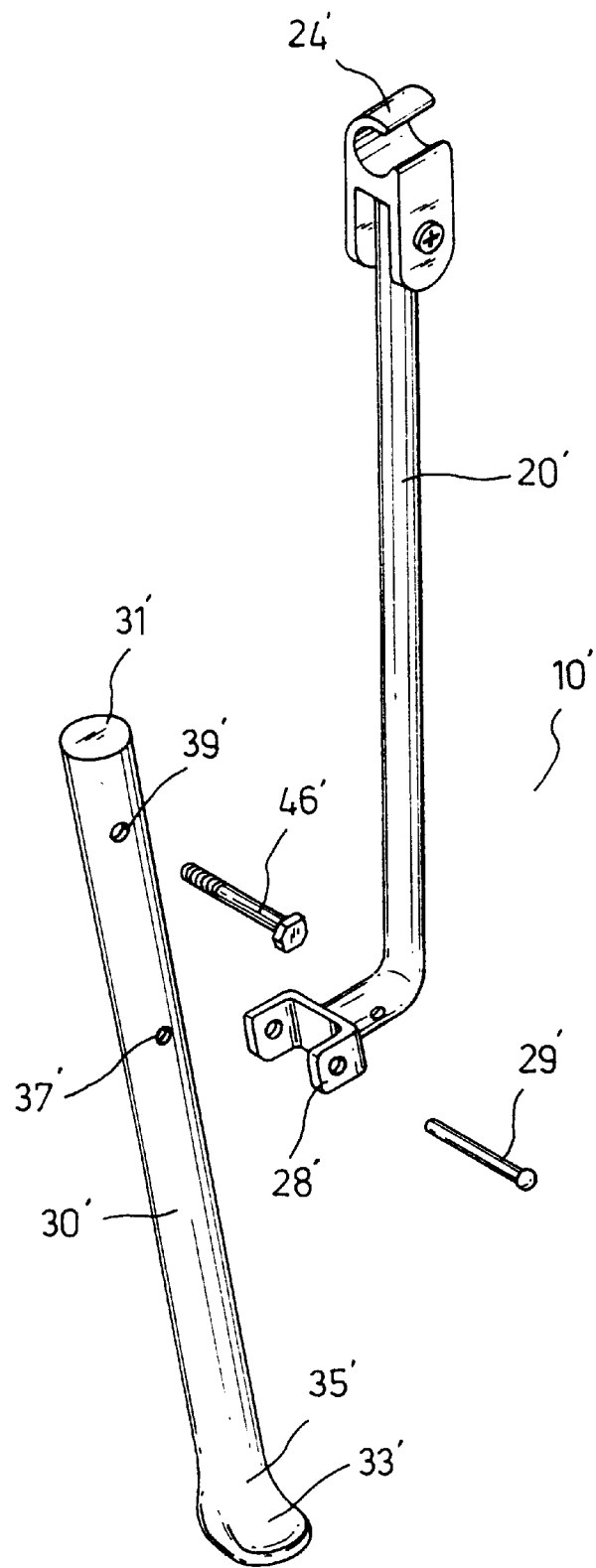
FIG. 5 shows a perspective exploded view of a standing device in accordance with a second embodiment of the present invention.

FIG. 5 shows a second embodiment of the standing device 10' in accordance with the present application. In this embodiment, the span D between an upper cross bar 50 and a lower cross bar 60 as similarly shown in FIG. 2 is assumed to be shortened when a stroller is in a collapsed position. As shown in FIG. 5, the standing device 10' includes a connecting rod 20' and a leg 30'. The connecting rod 20' is preferably bent as was described for the connecting rod 20 and is provided with a C-shaped tube holder 24' for pivotally coupling to the upper cross bar (not shown) and a joint 28' at respective ends. The leg 30' has a first end 31' and a second end 35' respectively defined with an aperture 39' and a foot 33'. As shown, a bolt 46' serving as a pivotal pin passes through the aperture 39' and threadedably engages with a nut (not shown) on the lower cross bar to latch the leg 30' to the lower cross bar (not shown). The leg 30' further defines a hole 37' between the aperture 39' and the foot 33' for pivotally connecting to the joint 28' by a rivet 29'. In this embodiment, when the stroller used with standing device 10' is collapsed, the span between the upper cross bar and the lower cross bar is shortened. Thus, the connecting rod 20' is moved downward and the leg 30' is pivotally moved downward such that the foot 33' will serve as a support for the collapsed stroller.

It will be apparent to those skilled in the art that various modifications and variations can be made to the device, according to the present invention. The present invention covers such modifications and variations as defined by the scope of the appended claims and their equivalents.

What is claimed is:

1. A standing device for use with a stroller that has a stroller upper cross bar and a stroller lower cross bar, the standing device comprising:

a connecting rod having a first end pivotally connectable to said stroller upper cross bar, and having a second end;

a radial pivotal pin securable to a central portion of said stroller lower cross bar and extending in a horizontal direction; and a leg pivotally connected to said radial pivotal pin and extending therefrom in a slant direction towards the ground, said leg having a pivotal joint pivotally connected to said second end of said connecting rod such that when said standing device is used with said stroller, said leg retracts to a position substantially parallel to said stroller lower cross bar when said stroller is unfolded, and said leg is pivotally moved to contact the ground by said connecting rod when the stroller is collapsed.

2. The standing device according to claim 1, wherein said pivotal joint extends in a transversal direction to an axis of said leg.

3. The standing device according to claim 1, wherein said pivotal joint is disposed on said leg at a position intermediate an end of said leg contacting the ground and a position connected to the pivotal pin.

4. The standing device according to claim 1, wherein a distal end portion of said leg is shaped to present a contact area with the ground when said standing device is used with a stroller that is collapsed.

5. The standing device according to claim 1, further including a C-shaped tube holder, connected to said first end of said connecting rod, pivotably attachable to said stroller upper cross bar.

6. The standing device according to claim 1, wherein said leg defines an aperture sized to permit said pivotal pin to pass therethrough.

7. The standing device according to claim 6, further including a C-shaped tube holder integrally formed with said pivotal pin and fixedly connectable to said stroller lower cross bar;

wherein a distal end of said pivotal pin includes a plurality of detents sized to pass through said aperture to permit latching said leg to said stroller lower cross bar.

8. The standing device according to claim 6, wherein said pivotal pin includes a threaded bolt passing through said aperture for threaded-engagement with said stroller lower cross bar.

9. The standing device according to claim 1, wherein said leg further includes a transversally-extending tubular projection, an interior of said tubular projection defining an aperture sized to permit said pivotal pin to pass therethrough.

10. The standing device according to claim 9, further including a C-shaped tube holder integrally formed with said pivotal pin and fixedly connectable to said stroller lower cross bar;

wherein a distal end of said pivotal pin includes a plurality of detents sized to pass through said aperture to permit latching said leg to said stroller lower cross bar.

11. The standing device according to claim 9, wherein said pivotal pin includes a threaded bolt passing through said aperture for threaded-engagement with said stroller lower cross bar.

12. The standing device according to claim 1, wherein a portion of said connecting rod is bent.

13. A standing device and a collapsible stroller combination, including:

a collapsible stroller including at least a stroller upper cross bar and a stroller lower cross bar;

a standing device including a connecting rod having a first end pivotally connected to said stroller upper cross bar, and having a second end;

a radial pivotal pin secured to a central portion of said stroller lower cross bar and extending in a horizontal direction; and a leg pivotally connected to said radial pivotal pin and extending therefrom in a slant direction towards the ground, said leg having a pivotal joint pivotally connected to said second end of said connecting rod such that said leg retracts to a position substantially parallel to said stroller lower cross bar when said stroller is unfolded, and said leg is pivotally moved to contact the ground by said connecting rod when the stroller is collapsed.

* * * * *